United States Patent
Essiambre et al.

(10) Patent No.: US 6,792,214 B1
(45) Date of Patent: Sep. 14, 2004

(54) DISPERSION COMPENSATION IN OPTICAL FIBER TRANSMISSION LINES

(75) Inventors: René-Jean Essiambre, Red Bank, NJ (US); Arthur F. Judy, Atlanta, GA (US); Torben N. Nielsen, Monmouth Beach, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 404 days.

(21) Appl. No.: 09/671,924

(22) Filed: Sep. 28, 2000

Related U.S. Application Data

(60) Provisional application No. 60/187,813, filed on Mar. 8, 2000.

(51) Int. Cl.$^7$ .............................................. H04B 10/12
(52) U.S. Cl. ...................... 398/147; 398/148; 398/81; 385/123
(58) Field of Search .......................... 398/147, 81, 148, 398/159, 192, 149; 385/123, 24

(56) References Cited

U.S. PATENT DOCUMENTS

| | | | | |
|---|---|---|---|---|
| 6,330,381 B1 | * | 12/2001 | Lu et al. | 385/24 |
| 6,570,691 B1 | * | 5/2003 | Miyauchi et al. | 398/147 |
| 6,574,404 B2 | * | 6/2003 | Sasaoka et al. | 385/123 |

* cited by examiner

*Primary Examiner*—Hung N. Ngo

(57) ABSTRACT

An optical transmission system designed for gigabit pulse rates and Raman pumping in which there is essentially no pre-dispersion compensation and the in-line dispersion compensation at the start of each span is overcompensation of between 110 and 120 of the compensation needed to neutralize the dispersion of its immediately preceding span.

14 Claims, 2 Drawing Sheets

DISPERSION COMPENSATION IN OPTICAL FIBER TRANSMISSION LINES

PRIORITY INFORMATION

This application claims priority based on U.S. Provisional Application No. 60/187,813, filed Mar. 8, 2000.

FIELD OF THE INVENTION

The present invention relates to the transmission of optical pulses over optical fibers and, more particularly, to the compensation of the dispersion that is normally experienced by optical pulses in their travel along optical fibers.

BACKGROUND OF THE INVENTION

The transmission of optical pulses that carry information over transmission lines has become of major commercial importance. Typically the fibers used for the transmission lines are filaments of high purity silica appropriately protected and they function as waveguides for the optical pulses. Such transmission lines provide transmission of laser pulses with sufficiently low loss so as to permit transmission over relatively long distances without need for regeneration. In many cases the factor that principally limits the total distance the pulses can travel without the need for regeneration is the broadening that the pulses experience during their travel because of the dispersion introduced by the fiber, i.e., pulses of different wavelengths travel with different phase and group velocities along the fiber, and each pulse typically has a broad spectral bandwidth of different frequencies.

Such broadening limits the spacing permissible between pulses and so the capacity of the system, which is related to the number of pulses per time interval that can be transmitted with the high fidelity demanded of many applications. High capacity is of course important to keep unit costs low.

Typically, in an optical fiber transmission line of appreciable multispan length, it is the practice periodically to introduce amplification of the pulses along their path, typically at the end of each span. In the past, the amplification has primarily been provided by discrete amplifiers, generally a relatively short length of erbium-doped fiber that is irradiated with pumping light of appropriate wavelengths so that it acts as an amplifier.

In addition to providing amplification of the optical pulses during their travel, it has become the practice in transmission lines of multispan length to introduce at the upstream end of each span periodic compensation for the dispersion discussed above, essentially to nullify the dispersion expected in the succeeding span. In the past, such compensation has generally taken the form of only partial or undercompensation at the upstream end of each span. The undercompensation at the upstream end has been generally practiced because some pulses tend to exhibit the "soliton effect" as a result of self phase modulation, which acts to lessen the broadening effect of the intrinsic dispersion of the fiber.

Systems of this kind have been working well and so have tended to warrant little change.

A recent trend has been to supplement the role of the discrete optical amplifiers used in the past by distributed amplification obtained by "Raman" pumping. Such supplemented amplification involves applying pumping light of appropriate wavelength to the fiber for transmission along the fiber, generally for travel upstream opposite to the direction of the signal pulses. Such pumping light can be made to interact with the optical signal pulses to provide amplification by Raman mixing.

However in such systems the use of undercompensation at the upstream end of each span has tended to give mixed results.

The invention is designed to provide a more satisfactory method for compensation for the dispersion involved.

SUMMARY OF THE INVENTION

The invention is applicable to an optical transmission system of the typical kind in which the transmission line includes a plurality of spans between the upstream end of the line, where input pulses from a transmitter are supplied, to the downstream end, where the output pulses are received by a receiver for either utilization or regeneration. Such a line typically has included a "pre-dispersion compensation" module at the input, or upstream, end of the line, a "post-dispersion compensation" module at the output, or downstream, end of the line and an "in-line dispersion compensation" module at each junction between the end of one span and the start of a new span. Each such dispersion compensation module (DCM) generally has been associated with a discrete optical amplifier that generally provides gain to compensate for the attenuation and compensation for the dispersion of the span traveled by the latter, which is generally provided by a section of fiber specially designed to provide a desired dispersion characteristic.

However, in accordance with an exemplary embodiment of the invention, a multispan transmission line of the kind just described would comprise a) an optical fiber, typically with positive dispersion, b) at the input or upstream end a module that provided little if any pre-dispersion compensation, c) at each junction between spans, a module that provided overcompensation of between five and thirty percent of the dispersion experienced in the preceding span, and d) at the output or downstream end, a module that provided the supplemental compensation needed essentially to nullify any remaining uncompensated dispersion of the path, typically undercompensation.

We have discovered that for optimum operation, as measured by the shape of the output pulses, there should be little or no pre-dispersion compensation, and between 110 and 120 percent compensation (10–20 percent overcompensation) of the dispersion of the preceding span at each in-line DCM. In particular, for a transmission line of six spans, each of about 80 km long, the best output pulse shape was obtained with no pre-compensation and 117 percent in-line compensation at each junction between spans. It appears that the larger the number of spans, the closer to the lower edge of the 110–120 percent range the in-line dispersion compensation should be.

Moreover, it also appears that the improvement obtainable is better when the system is also using Raman pumping to balance out the attenuation of the signal as it propagates along the line, the Raman pumping light being directed upstream, opposite in direction to the travel of the signal beam.

To this end, in the preferred embodiments of the invention, there would be included at the end of each span a source of pumping light of appropriate wavelength for Raman mixing amplification of the signal pulse for introducing the light for travel upstream to the start of the span.

It is found that some improvement is available also if the pre-compensation is kept below fifty percent and the in-line compensation at each junction is kept between 105 and 130 percent.

The invention will be better understood from the following more detailed description taken in conjunction with the accompanying drawing.

DETAILED DESCRIPTION

Figure 1:
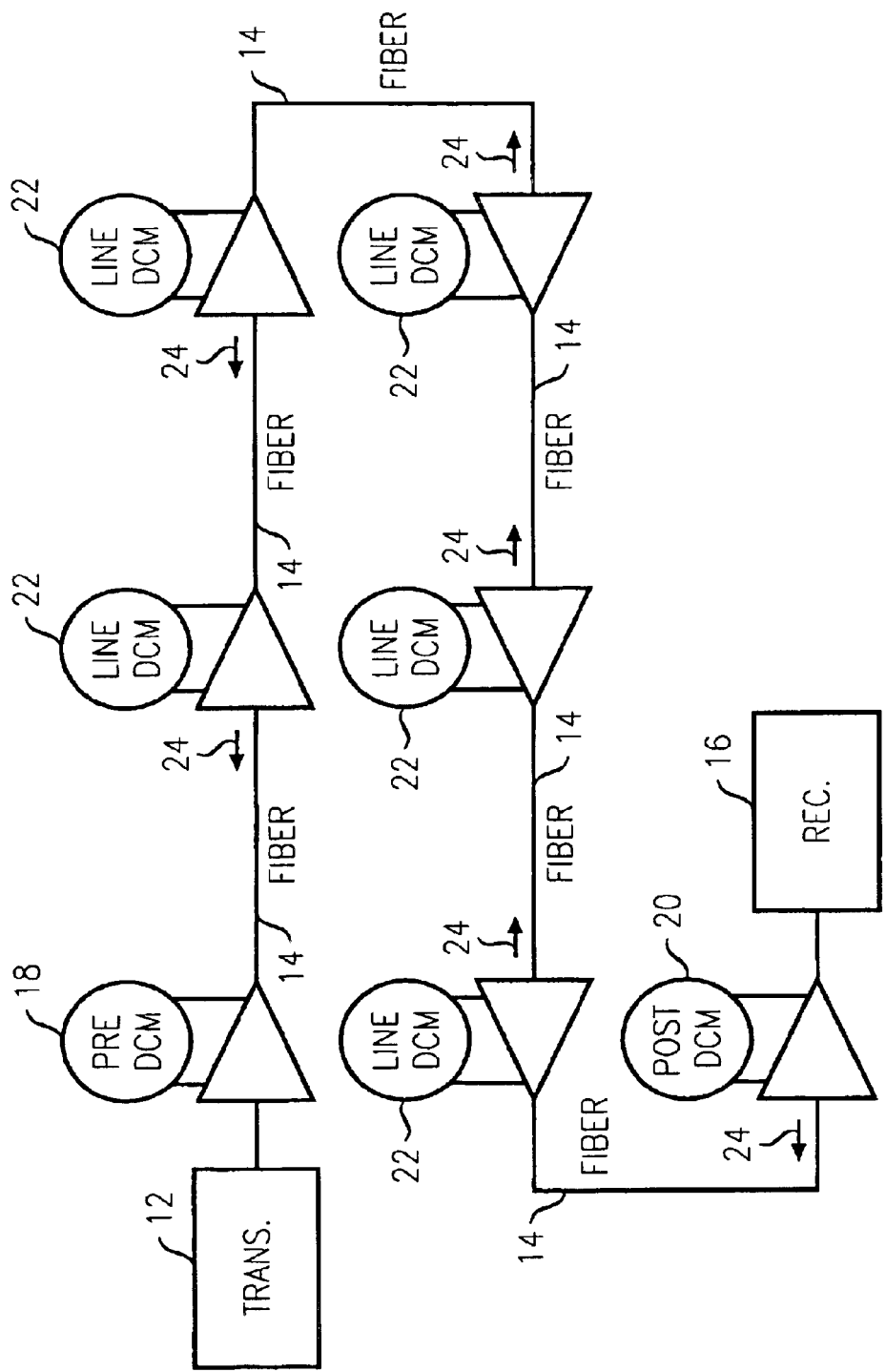
FIG. 1 shows a typical optical transmission system that includes Raman pumping of the kind to which the invention is especially applicable.

FIG. 1 shows in schematic form the basic elements of an optical transmission system 10 to which the invention is applicable.

It includes a transmitter 12 at the input, upstream, end of a transmission line 14 and a receiver 16 at the output, downstream, end of the line.

The transmitter 12 typically includes a plurality of lasers each of a different wavelength in either the C band, the band between 1530 and 1565 nanometers or the L band between 1570 and 1605 nanometers. The beam of each laser is separately modulated, typically at a gigabit rate. The invention is expected to be especially useful at very high bit rates, for example, at least forty gigabits per second. The pulses from the individual lasers are then multiplexed into a single stream that is applied to the input end of the line 14.

The receiver 16 at the output end of the line 14 typically includes apparatus that demultiplexes the multiwavelength stream into separate single or narrow wavelength beams, one for each channel. These are then converted into streams of electrical pulses from which the signal information is either recovered or used to regenerate a new set of optical pulses for retransmission along a new line.

The line 14, as shown, consists of six spans of fiber. Typically each would be about 80 kilometers long and of silica, advantageously of a positive dispersion. At the input (upstream) end of the line, there is provided a module 18, at the output end there is provided a post-dispersion compensation module 20, and at each junction between spans, there is provided an in-line dispersion compensation module 22. Each module typically would include both a section of fiber of appropriate length and dispersion to provide a desired amount of compensation and an amplifier, typically an erbium-doped length of fiber to provide enough amplification to overcome the loss introduced by the compensation fiber and to maintain the intensity of the signal beams at an appropriate level.

In particular, it has been found that the best-shaped pulses, from the standpoint of ease of separation and later conversion into electrical pulses with high fidelity of the signal information, were obtained in such a six-span system when there was provided no pre-compensation and the in-line compensation at the junction between spans was set at about 117 percent of the intrinsic dispersion of each span.

Additionally in systems of high bit rates, it has been advantageous to include distributed amplification by Raman counter pumping, at least in selected spans. The advantage of overcompensation in accordance with the invention is found even greater in systems with Raman pumping.

To this end, there is introduced, at the end of each span, by a wavelength division coupler of known form, pumping light from a suitable source for travel upstream to provide amplification to make up for the normal attenuation introduced by the optical fiber. This pumping light desirably is of about 1450 nanometers wavelength for C band signals and about 1490 nanometers wavelength for L band signals. In FIG. 1, the coupler and pumping light source are shown schematically by arrows 24.

Figure 2A:
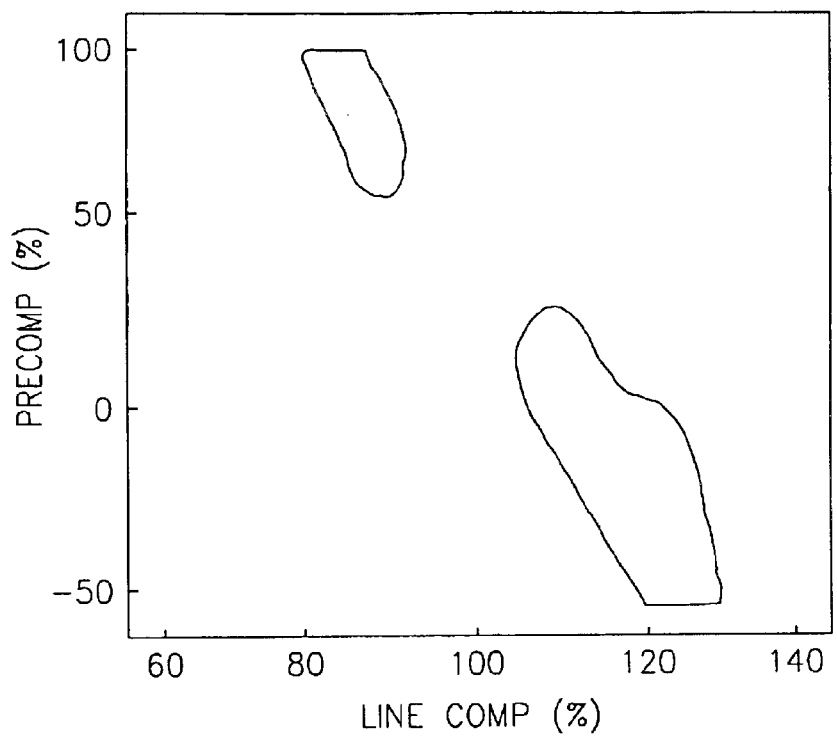
FIGS. 2A and 2B are graphs in which pre-compensation in percent is plotted against in-line compensation in percent to show the preferred range of values of each, for use in the invention.
Figure 2B:
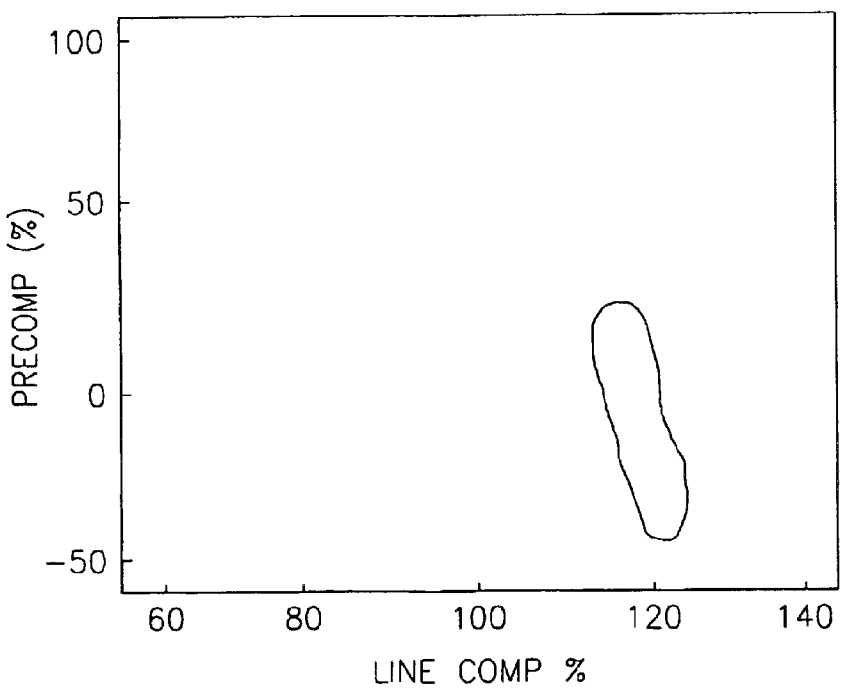

FIGS. 2A and 2B show the contour plot of the preferred range versus line compensation and pre-compensation for two pulse types, return-to-zero (RZ) in FIG. 2A, non-return-to-zero (NRZ) and in FIG. 2B with Raman counter-pumping. An optimal area of operation in each case is found at about 0% pre-compensation and 117% line-compensation.

The relationship between pre-compensation and line-compensation also depends on the launch power and the amount of Raman pumping. In general it appears that in a typical system for every 10% increase in pre-compensation the line-compensation should decrease by 3% for optimum operation.

In general, it appears that satisfactory results can be obtained with pre-compensation in the range of plus or minus 50%, with the optimum at about 0%, and in-line compensation of between 105% and 130%. Improved results are obtained with the pre-compensation in the region of 0% and in-line compensation of between 110% and 120%.

It is to be understood that the specific examples described are merely illustrative of the general principles of the invention and that other embodiments of the invention are feasible.

What is claimed is:

1. An optical transmission line system for transmitting multiwavelength optical pulses from a transmitter at one end to a receiver at the other end comprising a plurality of series-connected spans of optical fiber, each subject to dispersion;

an in-line dispersion compensation module at the junction between each span of the series; and a post-dispersion compensation module at the end of the last span of the series, characterized in that the dispersion compensation introduced by each in-line dispersion compensation module is overcompensation between about 105 and about 130 percent of the dispersion of its immediately preceding span and the dispersion compensation introduced by the post dispersion compensation module is sufficient to essentially neutralize any dispersion imbalance remaining in the path between the transmitter and the receiver.

2. The optical transmission line system of claim 1 in which there is dispersion compensation, introduced at the start of the first span, that is less than fifty percent of the dispersion of the first span of the transmission line.

3. The optical transmission line system of claim 2 in which there is supplied at the downstream end of selected spans for travel upstream counter to the direction of flow of the multiwavelength optical pulses, light of a shorter wavelength for the Raman amplification of the multiwavelength optical pulses.

4. The optical transmission line system of claim 1 in which there is essentially no dispersion compensation introduced at the start of the first span of the transmission line.

5. The optical transmission line system of claim 4 in which there is supplied at the downstream end of each selected span for travel upstream counter to the direction of flow of the multiwavelength optical pulses light of shorter wavelength for the Raman amplification of the multiwavelength optical pulses.

6. An optical transmission line system for transmitting multiwavelength optical pulses from a transmitter at one end to a receiver at the other end comprising a plurality of series-connected spans of optical fiber, each subject to dispersion;

an in-line dispersion compensation module at the junction between each span of the series; and a post-dispersion compensation module at the end of the last span of the series, characterized in that the dispersion compensation introduced by each in-line dispersion compensation module is between 110 and 120 percent of the dispersion of its immediately preceding span and the dispersion compensation introduced by the post dispersion compensation modulate is sufficient to essentially neutralize any dispersion imbalance remaining in the path between the transmitter and the receiver.

7. The optical transmission line system of claim 6 in which the dispersion introduced at the start of the first span is significantly less than fifty percent of the dispersion of the first span.

8. The optical transmission line system of claim 7 in which there is supplied at the downstream end of each selected span for travel upstream counter to the direction of flow of the multiwavelength optical pulses light of a shorter wavelength for the Raman amplification of the multiwavelength optical pulses.

9. The optical transmission line system of claim 6 in which there is introduced essentially no dispersion compensation before the start of the first span.

10. The optical transmission line system of claim 9 in which the dispersion compensation introduced by each in-line dispersion compensation module is about 117 percent of the dispersion of its immediately preceding span.

11. The optical transmission line system of claim 10 in which there is supplied at the downstream end of each selected span for travel upstream counter to the direction of flow of the multiwavelength optical pulses light, of a shorter wavelength for the Raman amplification of the multiwavelength optical pulses.

12. The optical transmission line system of claim 9 in which there is supplied at the downstream end of each selected span for travel upstream counter to the direction of flow of the multiwavelength optical pulses, light of a shorter wavelength for the Raman amplification of the multiwavelength optical pulses.

13. The optical transmission line system of claim 6 in which there is supplied at the downstream of each selected span for travel upstream counter to the direction of flow of the multiwavelength optical pulses, light of a shorter wavelength for the Raman amplification of the multiwavelength optical pulses.

14. An optical transmission line system for transmitting multiwavelength optical pulses from a transmitter at one end to a receiver at the other end comprising a plurality of series-connected spans of optical fiber, each subject to dispersion;

an in-line dispersion compensation module at the junction between each span of the series; and a post-dispersion compensation module at the end of the last span of the series, characterized in that the dispersion compensation introduced by each in-line dispersion compensation module is between 105 and 130 percent of the dispersion of its immediately preceding span and the dispersion compensation introduced by the post dispersion compensation module is sufficient to essentially neutralize any dispersion imbalance remaining in the path between the transmitter and the receiver;

and wherein there is supplied, at selected spans for travel upstream counter to the direction of flow of the multiwavelength optical pulses, light of a shorter wavelength for the Raman amplification of the multiwavelength optical pulses.

* * * * *